United States Patent [19]

Choi

[11] Patent Number: 5,572,498
[45] Date of Patent: Nov. 5, 1996

[54] DISC PLAYER THAT LOADS BOTH COMPACT DISC AND MINI-DISC

[75] Inventor: Hyungho Choi, Ahnyang, Rep. of Korea

[73] Assignee: Daewoo Electronics Co., Ltd., Seoul, Rep. of Korea

[21] Appl. No.: 374,087

[22] Filed: Jan. 18, 1995

[30] Foreign Application Priority Data

Jan. 19, 1994 [KR]  Rep. of Korea .................. 94-915

[51] Int. Cl.⁶ .................................................. G11B 33/02
[52] U.S. Cl. ........................................ 369/77.2; 369/75.2
[58] Field of Search .................... 369/77.1, 77.2, 369/75.2, 14, 15

[56] References Cited

U.S. PATENT DOCUMENTS

| | | | |
|---|---|---|---|
| 4,722,078 | 1/1988 | Nakanishi et al. | 369/39 |
| 5,299,185 | 3/1994 | Sakurai et al. | 369/77.2 |
| 5,301,176 | 4/1994 | Kawachi et al. | 369/75.2 |
| 5,341,352 | 8/1994 | Isobe | 369/197 |

FOREIGN PATENT DOCUMENTS 61-206962  9/1986  Japan .

Primary Examiner—John H. Wolff
Assistant Examiner—David D. Davis
Attorney, Agent, or Firm—Oliff & Berridge

[57] ABSTRACT

A disc player has a compact disc spindle assembly, mini-disc spindle assembly, and a pickup device on its base plate. A compact disc tray is connected with the base plate and a mini-disc tray is connected with the compact disc tray, respectively in a horizontally and vertically movable state. The disc player has a moving plate for driving the base plate and the compact disc tray. A mini-disc tray conveying device having a rack plate, a transfer gear, etc., is positioned between the compact disc tray and the mini-disc tray provided therein. Rack gears are formed on two opposite side walls of the mini-disc tray and the rack plate, and between the rack gears the transfer gear is interposed into which the fixed shaft projected upward from the lower surface of the compact disc tray is inserted. Thus, in loading a mini-disc cartridge or compact disc, the compact disc tray can be transferred horizontally together with the mini-disc tray provided therein. The transfer gear has a smaller first gear engaged with the rack gear on the side wall of rack plate, and a larger second gear engaged with the rack gear formed on the side wall of the mini-disc tray, whereby the mini-disc tray is transferred at a higher speed than a transfer speed of the compact disc tray in a loading or unloading operation.

5 Claims, 5 Drawing Sheets

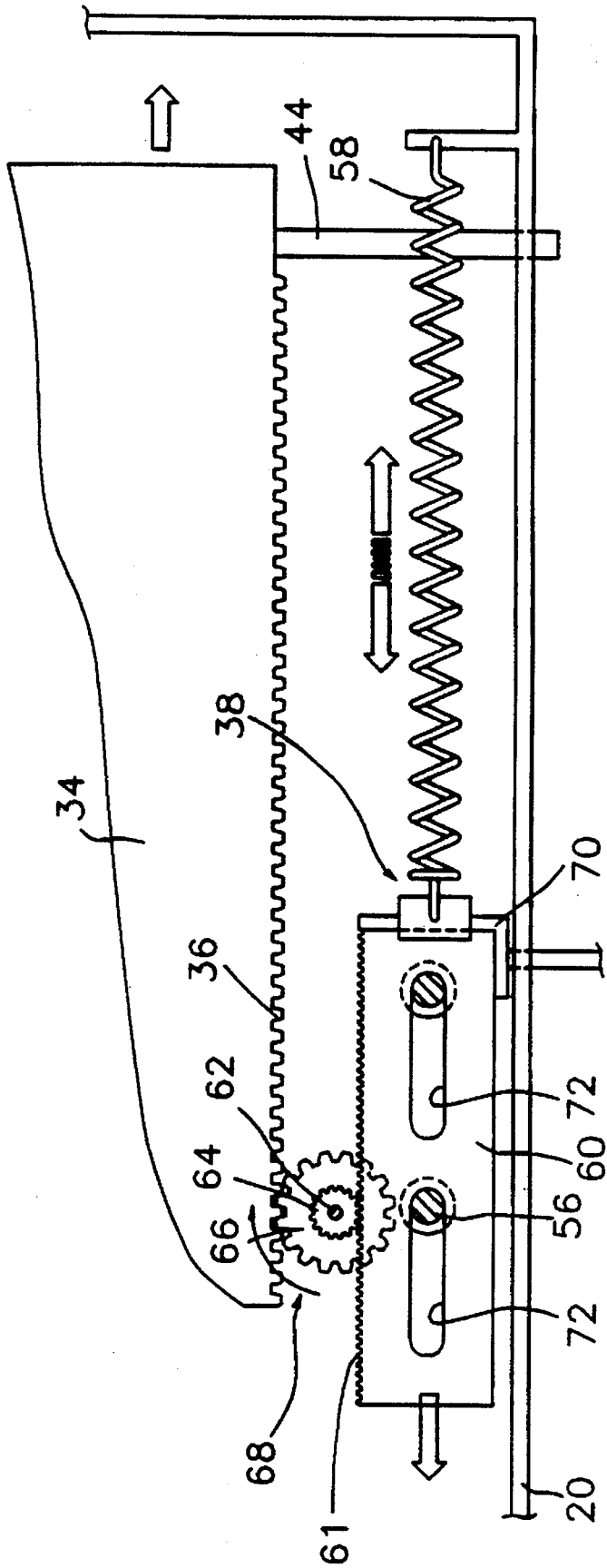

DISC PLAYER THAT LOADS BOTH COMPACT DISC AND MINI-DISC

BACKGROUND OF THE INVENTION

1. Field of the invention

The present invention relates to a disc player capable of loading both a compact disc and a mini-disc, and more particularly, to a disc player for loading and playing selectively a compact disc and a mini-disc by use of double loading devices and a single pickup devices.

2. Description of the Prior Arts

Disc players can record information on and/or reproduce information from discs of magnetic or optical recording type such as optical video disc, digital audio disc, compact disc, mini-disc, etc. Nowadays, each mini-disc player and compact disc player is used for reproduction of only its respective type of disc. Thus, when a user wants to obtain information from different types of discs, he should separately buy a new player applicable thereto.

In general, the disc which is at a naked state or at an encased state in a cartridge is mounted on the tray to be loaded on the player. These disc loading methods depend on the disc player's structure, so that the user can not load the disc by his own selection in view of the disc player's structure. Also, in fields of a common disc player used for reproducing discs of different sizes, although products which can reproduce the discs of different sizes such as a laser disc (LD), a compact disc (CD), etc. are being manufactured, those can be applicable only to the discs of different sizes which are at the naked state.

Further, Katsuichi Sakurai et al. proposed a disc player capable of reproducing both a naked disc and a cartridge-encased disc in E.P. publication 525201 A2 (corres U.S. Pat. No. 5,299,185). Also, Hideo Kawachi et al. proposed the disc player capable of reproducing both a naked disc and a cartridge-encased disc in E.P. Publication 518259 A3 (corres. U.S. Pat. No. 5,301,176). However, the above disc players can reproduce the disc having the same size (or diameter).

In the above Hideo Kawachi et al. patent, there is disclosed an apparatus for elevating the spindle assembly wherein one side of a chassis supporting the spindle assembly is fixed to a main chassis of the disc player and the spindle assembly can be moved up and down in a radial direction centering around the fixing point.

However, in the above Hideo Kawachi et al. patent, since only one end of the spindle assembly elevating apparatus is moved reciprocatingly while the other end is fixed, it is difficult to precisely adjust a position of the spindle assembly. Furthermore, the apparatus for elevating the spindle assembly can be applicable to the naked and cartridge-encased discs of only the same size, so that the disc player can not drive the MD and CD having different sizes, i.e., the smaller cartridge encased mini-disc and the larger naked compact disc.

Accordingly, there is a necessity for providing such disc player that is capable of driving both the smaller cartridge encased mini-disc and the larger naked compact disc.

SUMMARY OF THE INVENTION

The present invention is intended to overcome the above-mentioned and numerous other disadvantages and deficiencies of the prior art.

Therefore, it is an object of the present invention to provide a disc player which is capable of loading and playing selectively a compact disc and mini-disc by use double loading devices and a single pickup device.

To achieve the above-described object of the present invention, there is provided a disc player comprising:

a base plate having a bottom and side walls extending upward from opposite sides of the bottom, and having a compact disc spindle assembly and mini-disc spindle assembly disposed on the bottom and spaced from each other, and a pickup device respectively on the bottom;

a compact disc tray connected with the base plate in a horizontally and vertically movable state so that the compact disc can be loaded on the compact disc spindle assembly;

a mini-disc tray connected with the compact disc tray in a horizontally and vertically movable state so that the mini-disc can be loaded on the mini-disc spindle assembly;

a mini-disc tray conveying device provided between the compact disc tray and the mini-disc tray provided therein in order to transfer the mini-disc tray with a higher speed than a transfer speed of the compact disc tray in a loading or unloading operation; and a moving plate which moves horizontally by a driving apparatus for transferring the compact disc tray.

In accordance with the present invention, the mini-disc tray is provided with a rack gear formed along its side wall and at least one guide projection projected upward on a lower surface; and a mini-disc tray conveying device is provided with a rack plate having at least one guide hole elongated along a tray carrying direction, the rack plate being deposited on the lower surface of the compact disc tray while inserting the guide projection into the corresponding guide hole; a spring of which one end is connected to a rear end of the rack plate and the other end to a rear portion of the compact disc tray so that the rack plate can resiliently move against compact disc tray; a transfer gear having a first gear and a second gear in which the first gear engages with the rack gear formed on the side wall of rack plate and the second gear engages with the rack gear formed on the side wall of the mini-disc tray, the first gear and the second gear are integrally formed and a diameter of the second gear is larger than that of the first gear. Therefore, the mini-disc tray can be transferred at a higher speed than a transfer speed of the compact disc tray in a loading or unloading operation.

The disc player may further comprise a stopper which is projected from the side wall of the base plate of the side at which the mini-disc tray conveying device is present, and extended through the corresponding holes of the compact disc tray When loading the compact disc or the mini-disc, there is stopped the mini-disc tray conveying device positioned between the compact disc tray and the mini-disc tray provided therein by a stop member. Then the first and the second gear of the mini-disc tray conveying device are integrally rotated in the predetermined direction. Since the diameter of the second gear is larger than that of the first gear, the mini-disc tray is transferred at a higher speed than a transfer speed of the compact disc tray. By this way, the mini-disc or the compact disc can be selectively loaded on the appropriate spindle assembly. Accordingly, the present disc player is capable of loading and playing selectively a compact disc and mini-disc by use of double loading devices and a single pickup device.

BRIEF DESCRIPTION OF THE DRAWINGS

The present invention may be better understood and its numerous objects and advantages will be more apparent to

Figure 1:
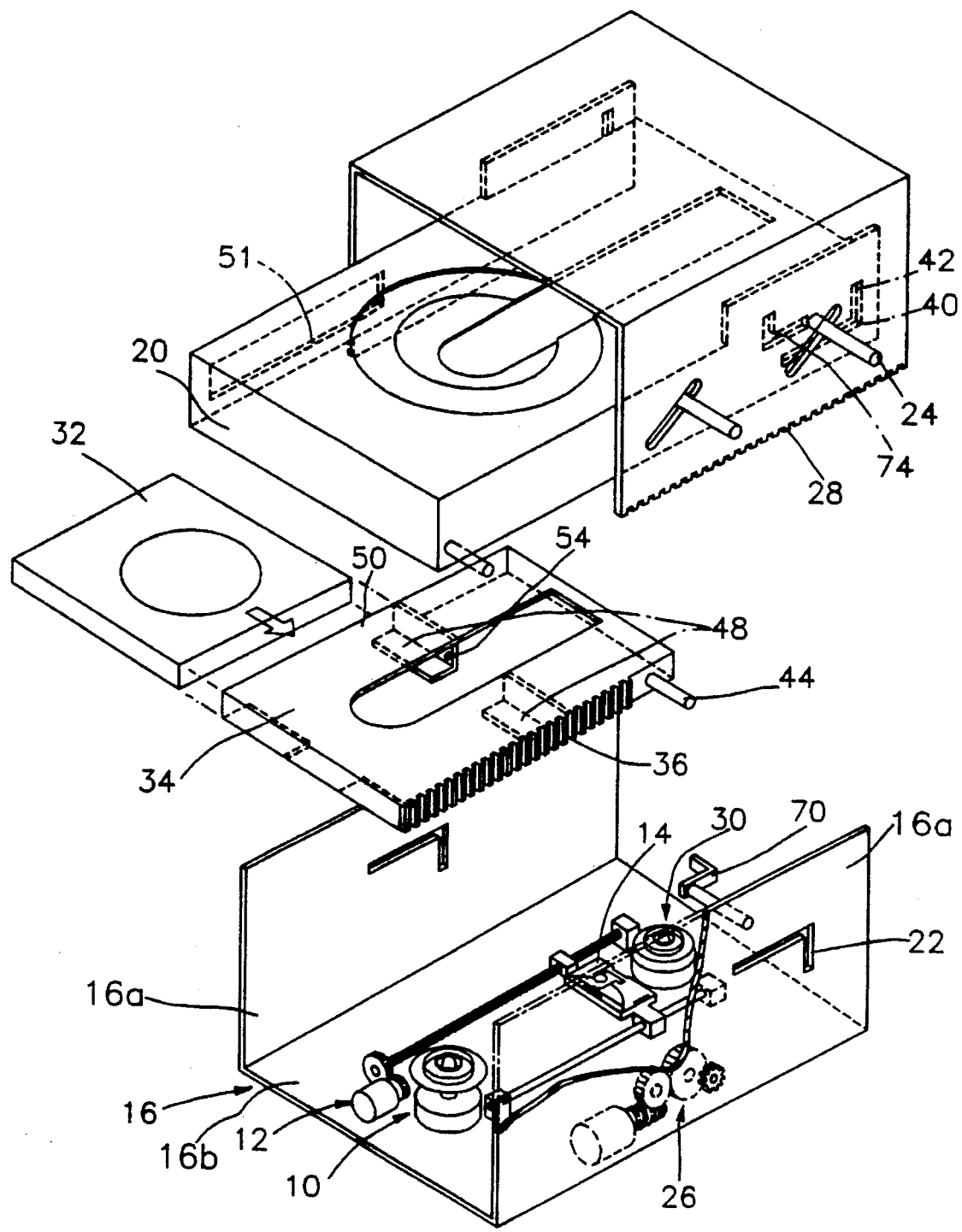
Figure 2:
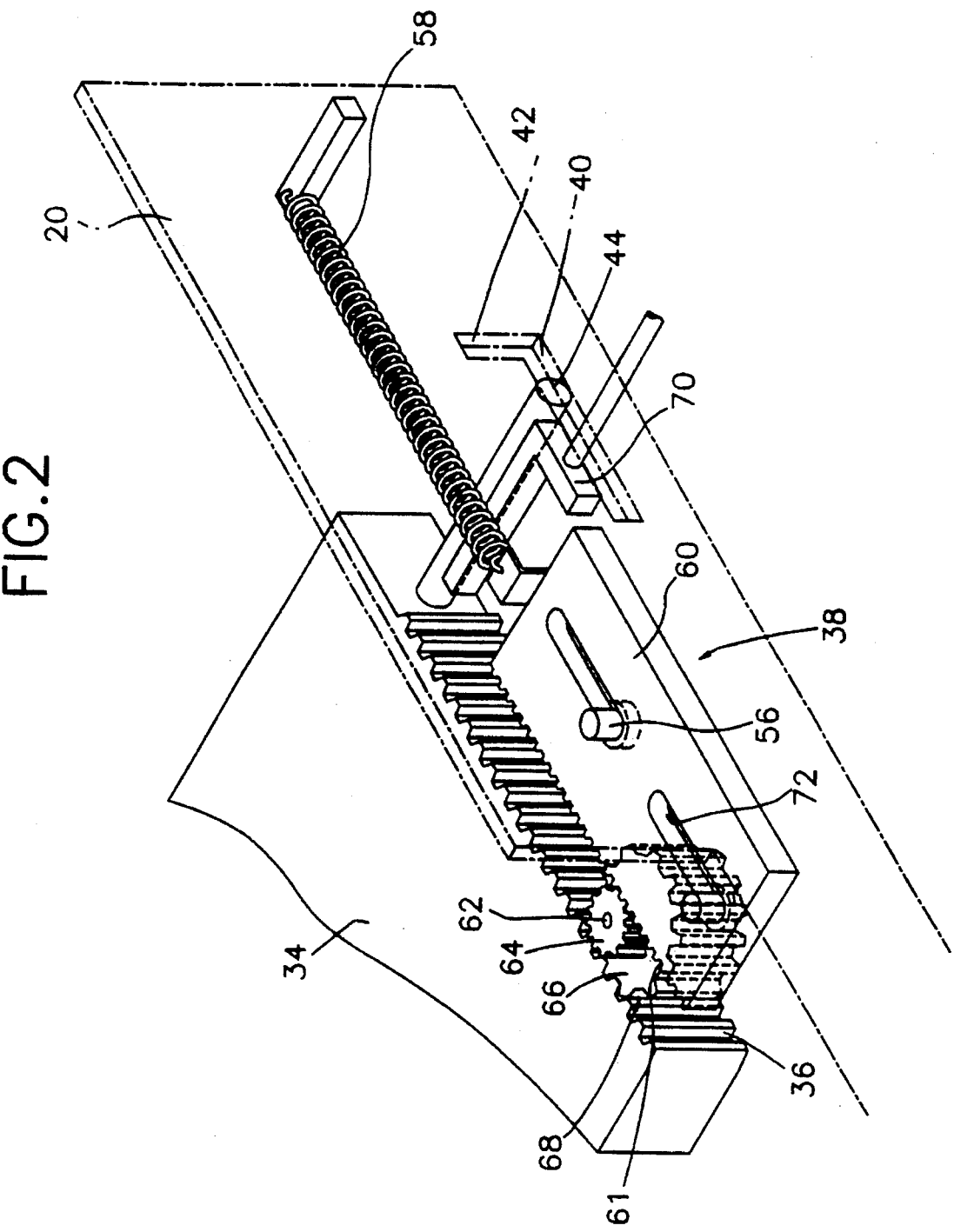
Figure 3:
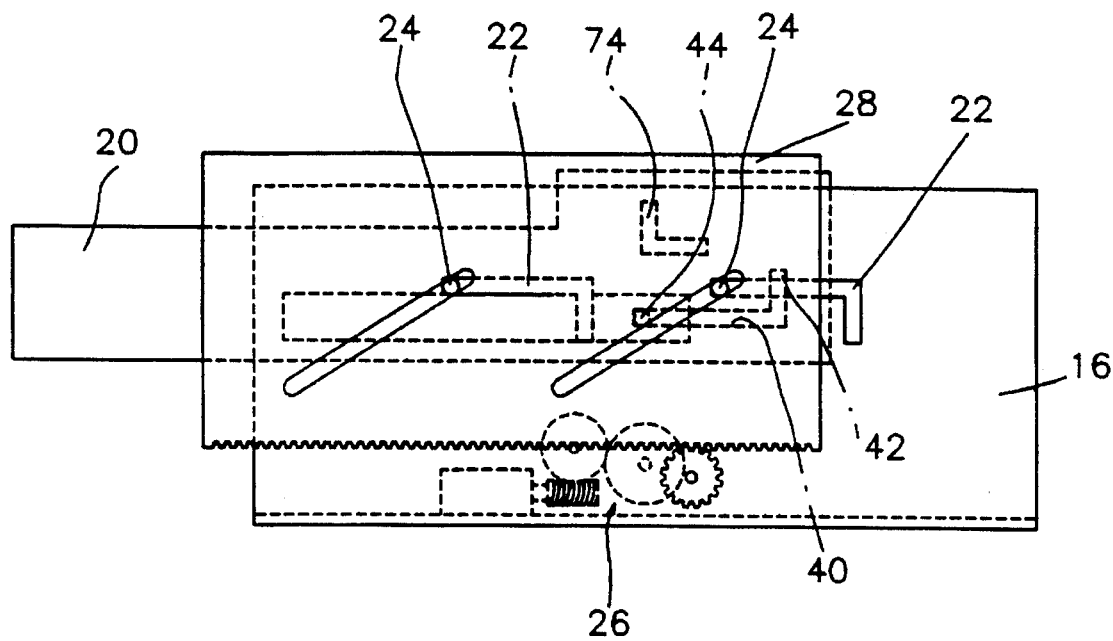
Figure 4:
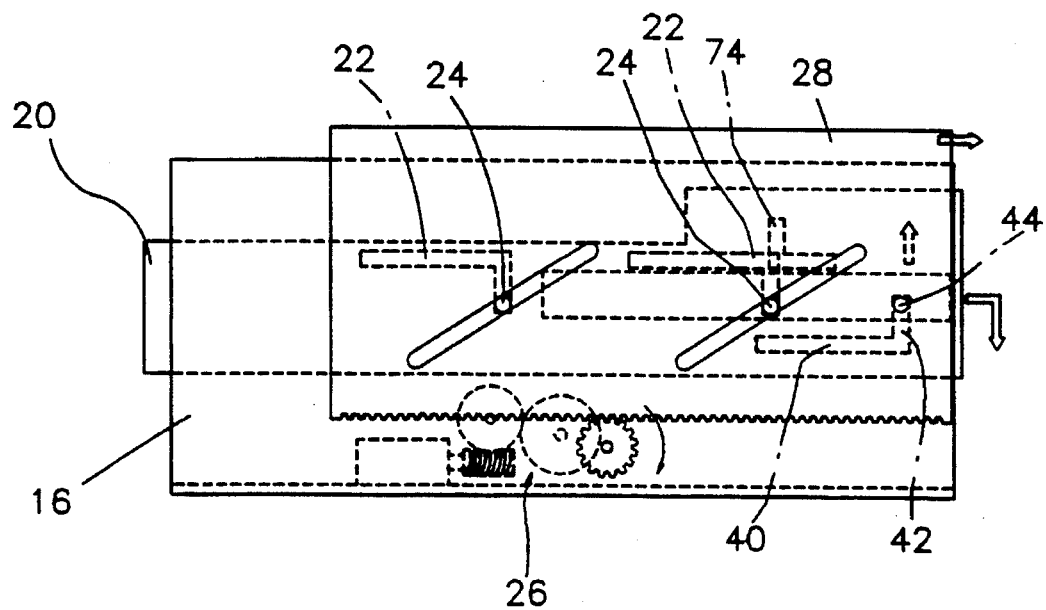
Figure 5:
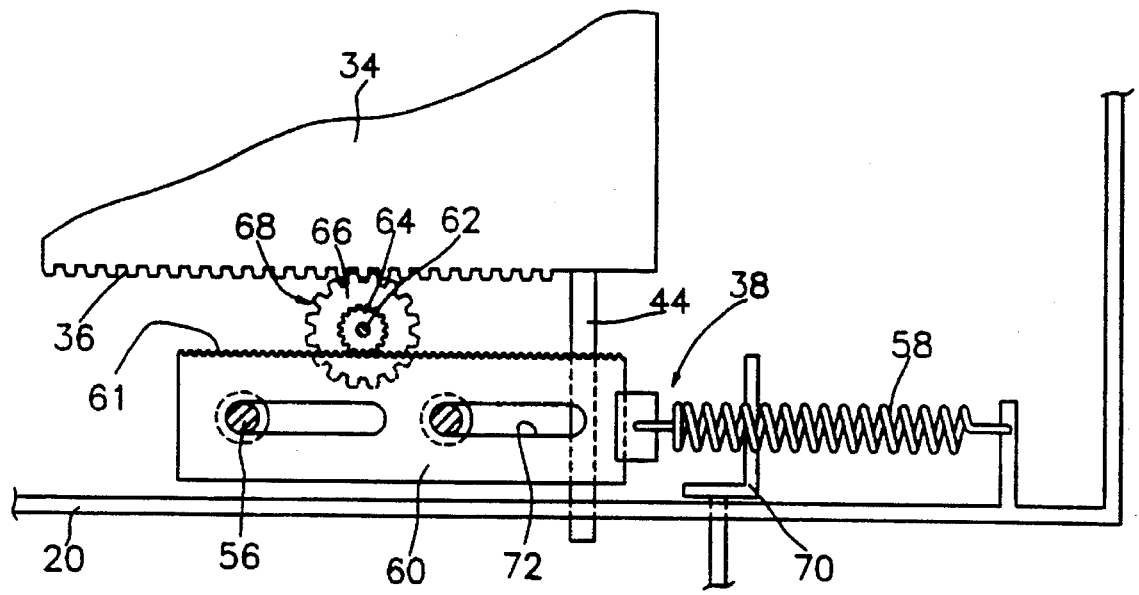
Figure 6:
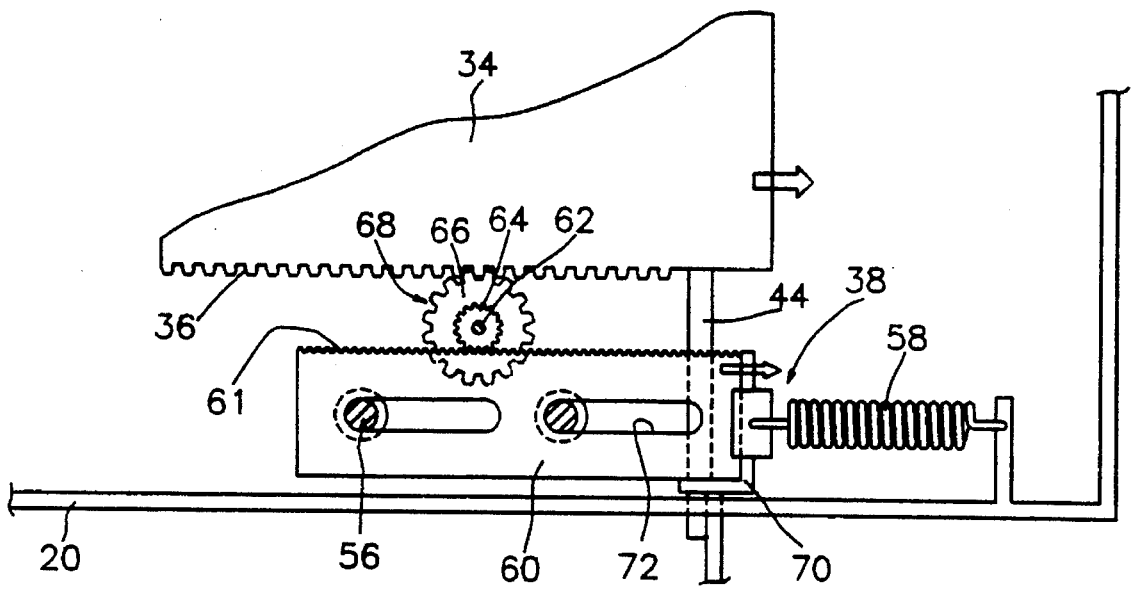

3 those skilled in the art by reference to the accompanying drawings in which:

FIG. 1 is an exploded perspective view of a disc player capable of loading both a mini-disc and a compact disc according to one embodiment of the present invention;

FIG. 2 is an enlarged view for showing a connection between a compact disc tray and a mini-disc tray of the disc player as shown in FIG. 1;

FIGS. 3 and 4 are side elevation views of the disc player shown in FIG. 1, respectively in which a disc is ejected and loaded; and FIGS. 5 through 7 are side elevation views of the connection part as shown in FIG. 2, respectively in which a disc is ejected, a disc is being loaded, and the rack plate is retained by the stopper.

DESCRIPTION OF THE PREFERRED EMBODIMENT

The preferred embodiments of this invention will be described in detail with reference to the accompanying drawings.

Hereinafter, the present invention will be described in detail with reference to the accompanying drawings.

FIG. 1 is an exploded perspective view of a disc player capable of loading both a mini-disc and a compact disc according to one embodiment of the present invention, and FIG. 2 is an enlarged view for showing a connection between a compact disc tray and a mini-disc tray of the disc player as shown in FIG. 1.

A base plate 16 of the disc player has a bottom 16b, and two opposite side walls 15a extending upward from the opposite sides of bottom 16b. A compact disc spindle assembly 10 and a mini-disc spindle assembly 30 are disposed respectively at a front part and a rear part of base plate 16 and spaced a predetermined interval apart from each other. Base plate 16 has a pickup device 14 disposed on bottom 16b to read information recorded on a disc while linearly moving in a radial direction of the disc between the two spindle assemblies alternatively by a general feeding device 12. Base plate 16 also has a driving device 26 including a motor and driving gears, which is disposed at a middle portion of one of side walls 16a in the presently preferred embodiment as shown in FIG. 1.

A compact disc tray 20 for loading a compact disc on compact disc spindle assembly 10 is disposed above base plate 16. Compact disc tray 20 has guide rods 24 provided on side walls thereof, and each of side walls 16b of base plate 16 has a guide hole 22 of an inverted "L" shape formed therein in order for guide rods 24 to be fitted and guided therein so that forward and backward linear movement, and upward and downward movement of tray 20 can be guided.

A moving plate 28 connected with base plate 16 and compact disc tray 20 is moved forward and backward by driving force generated by driving device 26 while providing compact disc tray 20 with power. That is, guide rods 24 of compact disc tray 20 are inserted through guide holes 22 of base plate 16 and holes formed in side walls of moving plate 28. Moving plate 28 has a rack formed at the lower end of a side wall of moving plate 28, and the rack is engaged with a gear of driving device 26, so that compact disc tray can be driven.

Mini-disc cartridge-receiving openings 51, 50 are formed at parts of side walls of compact disc tray 20 and mini-disc tray 34 in order for a mini-disc cartridge 32 to be inserted therethrough. Mini-disc tray 34 has two holding brackets 48 provided on a lower surface thereof to hold cartridge 32. Shutter protrusion 54 for opening/closing a shutter of cartridge 32 is disposed on an inner side surface of tray 34. Mini-disc tray 34 is movable forward and backward linearly, and upward and downward in compact disc tray 20 to load mini-disc cartridge 32 on spindle assembly 30. Guide rods 44 for guiding the movement of tray 34 protrude from the opposite side walls of mini-disc tray 34. Compact disc tray 20 has horizontal guide holes 40 and vertical guide holes 42 formed at aide walls thereof and respectively for guiding the forward and backward movement and the upward and downward movement of guide rods 44.

Referring to FIG. 2, a mini-disc tray conveying device 38 is disposed between compact disc tray 20 and mini-disc tray 34. Mini-disc tray 34 has a rack gear 36 formed at one side thereof facing mini-disc tray conveying device 38, the rack extending along a carrying direction of the tray. Guide protrusions 56 protrude upward from the lower surface of compact disc tray 20. A rack plate 60 of conveying device 38 has guide holes 72 extending along the direction of the movement of the tray, and a rack gear 61 formed at one side thereof facing mini-disc tray 34. Conveying device 38 is disposed on the lower surface of compact disc tray 20 while guide protrusions are inserted in guide holes 72. One end of a spring 58 is connected to the rear end of rack plate 60, and the other end of spring 58 is connected to the rear end of compact disc tray 20, so that rack plate 60 can move elastically relative to compact disc tray 20. A fixed shaft 62 protrudes from the lower surface of the compact disc tray into a space between mini-disc tray 34 and the side of rack plate 60 having the rack gear 61 formed thereon, and a conveying gear 68 formed incorporated with a first gear 64 and a second gear 66 is pivotally fitted on fixed shaft 62. First gear 64 is engaged with the rack gear 61 of rack plate 60, and second gear 66 under first gear 64 is engaged with the rack gear 36 of mini-disc tray 34. In the present embodiment, the diameter of second gear 66 is larger than that of first gear 64, so that the backing speed of mini-disc tray 34 is larger than the loading speed of compact disc tray 20. A stopper 70 protrudes inward from a side wall of base plate 16 having conveying device 38 disposed thereon through corresponding hole 74 of compact disc tray 20. Stopper 70 prevents rack plate 60 from being inserted in loading operation of compact disc tray 20.

Meanwhile, compact disc spindle assembly 10 and mini-disc spindle assembly 30 disposed on bottom 16b of base plate 16 are electrically connected to a microcomputer disposed on a printed circuit board, so that they can be operated only when a disc is loaded on each of them or a user operates a corresponding switch.

Hereinafter, the operation of the disc player having the above construction will be described.

FIGS. 3 and 4 are side elevations of the disc player shown in FIG. 1, respectively in which a disc is ejected and loaded. FIGS. 5 through 7 are side elevations of the connection part shown in FIG. 2, respectively in which a disc is ejected, a disc is being loaded, and the rack plate is retained by the stopper.

Referring to FIGS. 3 and 5, when a mini-disc cartridge 32 is loaded, it is firstly forced into mini-disc cartridge-receiving openings 51, 50 of compact disc tray 20 and mini-disc tray 34. Then, moving plate 28 moves backward according to the operation of driving device 26, and accordingly compact disc tray 20 and mini-disc tray 34 incorporated with each other are conveyed horizontally inward.

In the course of inward movement of trays 20 and 34, rack plate 60 of mini-disc tray conveying device 38 disposed at the interior of compact disc tray 20 comes into contact with stopper 70 protruding from the inner wall of base plate 16 through holes 74 of compact disc tray 20.

Accordingly, as shown in FIG. 7, conveying device 38 is stopped while compact disc tray 20 and mini-disc tray 34 go on moving horizontally. Then, second gear 66 together with first gear 64 incorporated therewith rotates clockwise while rack plate 60 moves in an inverse direction, that is, in a forward direction.

Second gear 66 rotates in the same direction, particularly clockwise in the present embodiment, as first gear 64 does, because they are incorporated with each other. In this case, the backward movement of mini-disc tray 34 is faster than the movement of compact disc tray 20 because second gear 66 has a larger diameter than first gear 64 has. When guide rods 24 of compact disc tray 20 reach the rear ends of guide holes 22 of base plate 16, guide rods 44 projected on the rear portion of the side walls of mini-disc tray 34 meet the rear ends of guide holes 40 of compact disc tray 20, which are farther away than the rear ends of guide-holes 22.

After the above horizontal movement, compact disc tray 20 moves downwards along guide holes 22 as shown in FIG. 4. At the same time, mini-disc tray 34 moves upwards along guide holes 42 of compact disc tray 20. Then, mini-disc cartridge 32 is loaded on the turntable of mini-disc spindle assembly 30, and the loading process is completed.

In this case, the turntable is operated and pickup device reads information recorded on the disc while moving in radial direction on the mini-disc, according to a "playing" order by a user.

Meanwhile, when mini-disc cartridge 32 is ejected, driving device 26 is operated inversely. Therefore, guide rods 24 of compact disc tray 20 are conveyed vertically upward in guide holes 22 of base plate 16, and at the same time mini-disc tray 34 moves downward vertically in guide holes 42 of compact disc tray 20.

Then, trays 20 and 34 move horizontally forward by the driving device, and at the same time rack plate 60 is restored to its original position by the restoring force of spring 58, and accordingly first and second gears 64 and 66 rotate in a direction inverse to that when a disc is loaded. Therefore, mini-disc tray 34 moves forward rapidly, and then the ejecting process is completed after continuing forward-conveying operation of moving plate 28.

Meanwhile, when a compact disc is loaded, it is firstly put on a loading face of compact disc tray 20 and then tray 20 is forced into the disc player. Then, all the components of the disc player are loaded on the compact disc spindle assembly in the same manner as was described above in case of loading the mini-disc. That is, the compact disc is conveyed horizontally and vertically together with tray 20 and then loaded on spindle assembly 18.

According to the present invention as described above, a mini-disc of cartridge-encased type which is small sized and a naked compact disc which is relatively larger than the mini-disc can be loaded concurrently, and they can be reproduced alternatively by means of a single pickup device. Therefore, the disc player can be miniaturized.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A disc player comprising:

a base plate having a bottom and side walls extending upward from opposite sides of said bottom, and having a compact disc spindle assembly and a cartridge encased mini-disc spindle assembly disposed on said bottom and spaced from each other, and a pickup device respectively on said bottom;

a compact disc tray connected with said base plate in a horizontally and vertically movable state so that the compact disc can be loaded on the compact disc spindle assembly;

a moving plate which moves horizontally by a driving apparatus for transferring said compact disc tray;

a cartridge encased mini-disc tray connected with said compact disc tray in a horizontally and vertically movable state so that the cartridge encased mini-disc can be loaded on the cartridge encased mini-disc spindle assembly, the cartridge encased mini-disc tray being provided with a rack gear formed along the side wall of said cartridge encased mini-disc tray and at least one guide projection projected upward on a lower surface of the compact disc tray; and a cartridge encased mini-disc tray conveying device provided between said compact disc tray and said cartridge encased mini-disc tray, in which said cartridge encased mini-disc tray is provided in the compact disc tray, the cartridge encased mini-disc tray conveying device being provided with:

a rack plate having at least one guide hole elongated along a cartridge encased mini-disc tray carrying direction, the rack plate being deposited on the lower surface of the compact disc tray with the guide projection inserted into the corresponding guide hole;

a spring of which one end is connected to a rear end of the rack plate and the other end of the spring is connected to a rear portion of the compact disc tray so that the rack plate can resiliently move against compact disc tray; and a transfer gear having a first gear and a second gear in which the first gear engages with the rack gear formed on the side wall of rack plate and the second gear engages with the rack gear formed on the side wall of the cartridge encased mini-disc tray, the first gear and the second gear are integrally formed with each other, and a diameter of the second gear is larger than that of the first gear, such that the cartridge encased mini-disc tray is transferred at a higher speed than a transfer speed of the compact disc tray in a loading or unloading operation.

2. The disc player according to claim 1, further comprising a stopper which is protected from the side wall of the base plate of the side at which the cartridge encased mini-disc tray conveying device is located, and extended through the corresponding holes in the compact disc tray.

3. A disc player comprising:

a base plate having a bottom and side walls extending upward from opposite sides of said bottom, and having a compact disc spindle assembly and a cartridge encased mini-disc spindle assembly disposed on said bottom and spaced from each other, and a pickup device respectively on said bottom;

a compact disc tray connected with said base plate in a horizontally and vertically movable state so that a compact disc can be loaded on the compact disc spindle assembly;

a moving plate which moves horizontally by a driving apparatus for transferring said compact disc tray;

a cartridge encased mini-disc tray connected with said compact disc tray in a horizontally and vertically movable state so that a cartridge encased mini-disc can be loaded on the cartridge encased mini-disc spindle assembly, and a cartridge encased mini-disc tray conveying device provided between said compact disc tray and said cartridge encased mini-disc tray, in which said cartridge encased mini-disc tray is provided in the compact disc tray, the cartridge encased mini-disc tray being provided with guide rods formed on a rear portion of the side walls of said cartridge encased mini-disc tray and the compact disc tray is provided with horizontal guide holes extended along a tray carrying direction, and vertical guide holes extended upward from rear ends of said horizontal guide holes respectively, so that the cartridge encased mini-disc tray can be moved horizontally and vertically within said compact disc tray.

4. The disc player according to claim 3, wherein the cartridge encased mini-disc tray is provided with a rack gear formed along the side wall of said cartridge encased mini-disc tray and at least one guide projection projected upward on a lower surface of the compact disc tray; and the cartridge encased mini-disc tray conveying device has:

a rack plate having at least one guide hole elongated along a cartridge encased mini-disc tray carrying direction, the rack plate being deposited on the lower surface of the compact disc tray with inserting the guide projection inserted into the corresponding guide hole;

a spring of which one end is connected to a rear end of the rack plate and the other end of the spring is connected to a rear portion of the compact disc tray so that the rack plate can resiliently move against compact disc tray; and a transfer gear having a first gear and a second gear in which the first gear engages with the rack gear formed on the side wall of rack plate and the second gear engages with the rack gear formed on the side wall of the cartridge encased mini-disc tray, the first gear and the second gear are integrally formed with each other, and a diameter of the second gear is larger than that of the first gear, such that the cartridge encased mini-disc tray is transferred at a higher speed than a transfer speed of the compact disc tray in a loading or unloading operation.

5. The disc player according to claim 3, further comprising a stopper which is projected from the side wall of the base plate of the side at which the cartridge encased mini-disc tray conveying device is located, and extended through the corresponding holes of the compact disc tray.

* * * * *